United States Patent [19]

Staley

[11] 3,937,115

[45] Feb. 10, 1976

[54] ELECTRONIC PIANO CIRCUIT ARRANGEMENT

[75] Inventor: James G. Staley, Batavia, N.Y.

[73] Assignee: The Wurlitzer Company, Chicago, Ill.

[22] Filed: Aug. 1, 1974

[21] Appl. No.: 493,690

[52] U.S. Cl. .................... 84/1.23; 84/1.12; 84/1.13; 84/1.21; 84/1.26

[51] Int. Cl.$^2$ ........................ G01H 1/06; G01H 5/02

[58] Field of Search .......... 84/1.01, 1.03, 1.11–1.13, 84/1.19, 1.21–1.23, 1.26

[56] References Cited

UNITED STATES PATENTS

| | | | |
|---|---|---|---|
| 3,305,675 | 2/1967 | Haase | 84/1.23 X |
| 3,505,461 | 4/1970 | Omura et al. | 84/1.01 |
| 3,515,039 | 6/1970 | Omura et al. | 84/1.01 |
| 3,594,487 | 7/1971 | Jones, Jr. | 84/1.01 X |
| 3,610,799 | 10/1971 | Watson | 84/1.01 |
| 3,629,480 | 12/1971 | Harris | 84/1.03 |
| 3,697,662 | 10/1972 | Adachi | 84/1.13 |
| 3,700,781 | 10/1972 | Obayashi | 84/1.01 |
| 3,760,358 | 9/1973 | Isii et al. | 84/1.01 X |
| 3,775,545 | 11/1973 | Tsukamoto et al. | 84/1.01 |
| 3,808,344 | 4/1974 | Ippolito et al. | 84/1.01 |
| 3,821,459 | 6/1974 | Schrecongost | 84/1.13 |
| 3,831,015 | 8/1974 | Hoff, Jr. | 84/1.01 X |
| 3,844,192 | 10/1974 | Brand et al. | 84/1.01 |

*Primary Examiner*—L. T. Hix
*Assistant Examiner*—Stanley J. Witkowski
*Attorney, Agent, or Firm*—Olson, Trexler, Wolters, Bushnell & Fosse, Ltd.

[57] ABSTRACT

Disclosed is an electronic piano circuit arrangement which combines a multitude of different frequencies within a resistordiode matrix array. The resistor-diode coupling elements provide a different value impedance for various signals to be combined and the amplitude of the signals are predetermined to electronically produce a piano sound which substantially corresponds to the sound of an actual piano tone.

7 Claims, 3 Drawing Figures

Fig-3

M.F.G.
DIVIDER BANK
DIODE ADDERS
KEY SW.
PULSE & SUSTAIN KEYER
FILTERS
AMPLIFIER
POWER SUPPLY

TO 72 NOTES
43.65
46.24
48.9
51.9
55.0
58.27
61.73
65.4
69.3
73.4
77.8
82.4
87.3
92.5
98.0
103.8
110.0
116.54
123.5
130.8
138.6
146.8
155.6
164.8
174.6
185.0
196.0
207.5
220.0
233.1
247.0
261.6
277.1
293.7
311.1
329.6
349.2
370.0
392.0
415.3
440.0
466.0
493.0
523.0
554.0
587.0
622.0
659.0
698.0
739.0
783.0
830.0
880.0
932.0
987.0

ELECTRONIC PIANO CIRCUIT ARRANGEMENT

BACKGROUND OF THE INVENTION

This invention relates generally to electronic musical instruments, and more particularly to an electronic piano circuit arrangement which combines a plurality of different signals to obtain the desired tone quality to a piano note. More specifically, the invention is directed to a circuit arrangement which enables combining a multitude of different frequencies in a simple and efficient manner to obtain the desired piano note quality characteristics.

Heretofore, the reproduction of piano sounds by electronic means has been, at best, a first order approximation of the frequency and its associated harmonics. Through extensive research over the years it has been discovered that the actual quality of a piano note, as perceived by listeners, is a combination of factors such as the fundamental frequency, the attack characteristic, the decay characteristic, the harmonics and the combination of other unrelated frequencies. By experimentation it has been determined that by adding the proper amplitudes of harmonics and other frequencies to the fundamental frequency, a more accurate electronic reproduction of an actual piano note can be made. By varying the amplitude of the various signals to be combined, one can produce a piano note quality which is virtually undetectable from that of a real piano tone. This information was set forth in *The Journal of the Acoustical Society of America*, Volume 34, Number 6, in June of 1962.

In the past, the production of such high quality electronic piano tones has been a very expensive and difficult procedure in that it required large numbers of oscillators and variable amplitude control circuits to insure the proper combination of amplitude signals. This prior art approach was very impractical and required enormous expense and time to produce a piano of the electronic type having the desired tone quality characteristics.

SUMMARY OF THE INVENTION

Accordingly, it is an object of this invention to provide a new and improved circuit arrangement whereby an electronic piano tone characteristic can be obtained by combining various amplitudes of harmonics and other signals with the fundamental frequency in an efficient circuit arrangement which is relatively simple and inexpensive to manufacture.

Briefly, the electronic musical circuit arrangement disclosed herein incorporates an X-Y matrix array which utilizes a diode-resistance, series-connected circuit at selected ones of a plurality of crossover points of the matrix. The value of the resistance at each of the crossover points is preselected to introduce into the output line a specific predetermined amplitude of either harmonics or other unrelated frequencies with that of the fundamental frequency so that the tone quality characteristic thereof is more accurately that of an actual piano tone. The resistance value at each of the crossover points may be formed internally with a diode element or may be a discrete resistance element connected in series therewith. The entire matrix array may be formed by large scale integration.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figures 1, 2, 3:
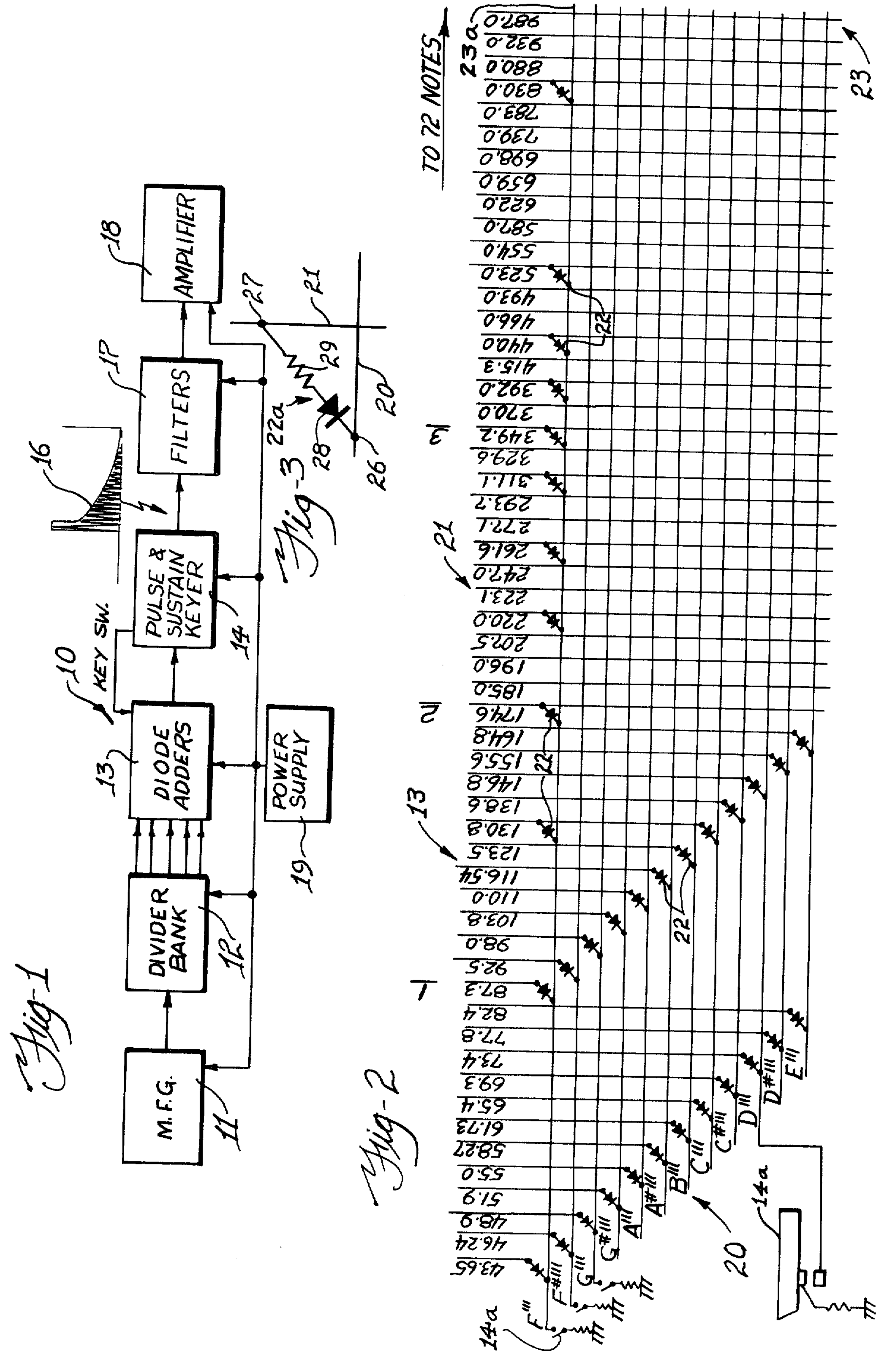
FIG. 1 is a block diagram illustrating the overall general concepts of an electronic piano constructed in accordance with the principles of this invention.
FIG. 2 is a fragmentary circuit arrangement of an X-Y matrix array showing the diode connection at selected crossover points for mixing together desired frequencies at predetermined amplitudes to obtain the desired tone quality.
FIG. 3 is a fragmentary circuit arrangement illustrating a diode-resistor series connection at selected ones of the crossover points.

Referring now to FIG. 1, a block diagram of an electronic piano constructed in accordance with the principles of this invention is shown and designated generally by reference numeral 10. The electronic circuit arrangement 10 includes a multifrequency generator 11, which may be operated from a clock frequency oscillator in the order of about 500 KHz. The output of the multifrequency generator 11 is a plurality of different frequencies which may correspond to the third octave above middle C. These fundamental frequencies are then delivered to a divider bank circuit arrangement 12 to be divided and thereby produce the corresponding lower frequency octaves as well as the desired harmonics.

Most advantageously, the divider bank 12 is delivered through a diode adder circuit arrangement 13 to a pulse and sustain keyer circuit 14. The diode adder circuit 13 includes impedance elements which allow adding together the desired amplitude of predetermined frequencies so that the tone quality of the electronic piano is substantially that of an actual piano. The pulse and sustain keyer circuit 14 produces the attack, decay and sustain characteristics of an actual piano note, as indicated by the waveform curve 16. This output signal is delivered through appropriate filter circuits indicated generally by reference numeral 17 and therefrom to an amplifier and output circuit arrangement 18. The entire circuit arrangement 10 is operated from a power supply 19 which applies suitable operating voltage to all of the stages of the circuit arrangement.

FIG. 2 illustrates a fragmentary portion of the diode adder circuit 13 and only a fragmentary portion of the keyer actuating lines associated therewith. By way of example, the lowest octave of the piano keyboard, that being the third octave below middle C, is illustrated herein. A plurality of lines 20 are connected to suitable keyer circuits 14*a* which activate the transfer of frequency signals at a plurality of lines 21. The signal on selected ones of the lines 21 is then transferred through the diode resistance arrangement as indicated generally by reference numeral 22 so that a gating action occurs. This will transfer the appropriate frequencies to the output side 23 of the lines 21 so that they can be delivered to the pulse and sustain keyer circuit, filter circuit and amplifier and output circuits. For example, the F''' note will transfer frequencies 43.65, 87.3, 130.8, 74.6, 220.0, 261.6, 311.1, 349.2, 392.0, 440.0, 523.0 ınd 830.0 to the output line 23*a* whenever the low F :ey is actuated. The specific amplitude of each of the ıotes combined herein is determined by the amount of esistance connected in series with the diode at the :rossover point of the matrix array.

This is best illustrated in FIG. 3 which illustrates a liode-resistance network 22*a* having circuit points 26 ınd 27 connected to the keyer lines 20 and frequency nput line 21, respectively. Here a discrete diode elenent 28 is connected in series with a discrete resistance :lement 29 of a predetermined selected value so that he amplitude of the signal being combined is selected o produce the note quality.

What has been described is a simple and efficient liode resistor matrix array which enables combining requencies of various amplitudes, both harmonic and ıon-related frequencies, to obtain electronically the piano tone qualities of an actual piano. Variations and nodifications of this invention may be effected without leparting from the spirit and scope of the novel con:epts disclosed and claimed herein.

The invention is claimed as follows:

1. In an electronic piano circuit the combination comprising: multifrequency generator means for providing the fundamental and harmonic frequencies for each of the notes of a piano keyboard, a matrix array having a first group of lines to receive each of the fundamental and harmonic frequencies of the notes and said piano keyboard, said matrix array having a second group of lines, key switch means associated with a piano keyboard and coupled to said second group of lines, said second group of lines including means to transfer said fundamental frequency and a predetermined number of harmonic frequencies by the actuation of a single key switch of said key switch means, and resistor-diode coupling means between selected ones of said first and second groups of lines, the resistance value of each of said resistor-diode coupling means being selected to transfer different amplitude values of said fundamental and harmonic frequencies, whereby combining of the different values of the fundamental and harmonic frequencies will produce an apparent authentic piano sound.

2. The electronic piano circuit as set forth in claim 1 wherein said selected ones of said plurality of first group of lines combine harmonics with the fundamental frequency.

3. The electronic piano circuit arrangement as set forth in claim 1 wherein said resistor-diode coupling means combines frequencies which differ from the fundamental frequency and the harmonic frequencies thereof.

4. The electronic piano circuit arrangement as set forth in claim 1 wherein said matrix array is an X-Y matrix array having the crossover points tied together by said resistor-diode coupling means.

5. The electronic piano circuit arrangement as set forth in claim 1 wherein said resistor — diode coupling means is formed by a series connected resistor and diode.

6. The electronic piano circuit arrangement as set forth in claim 1 further including a pulse and sustain keyer circuit coupled to said matrix array and activated by said key switch means for developing a piano envelope characteristic curve having attack, decay and damping characteristics.

7. The electronic piano circuit as set forth in claim 6 further including filter circuit means for receiving the combined fundamental and harmonic frequencies, and an amplifier circuit connected to said filter circuit for amplifying said frequencies and producing audio output signals therefrom.

* * * * *